(12) United States Patent
Kakegawa et al.

(10) Patent No.: US 10,832,061 B2
(45) Date of Patent: Nov. 10, 2020

(54) TRAVELING ROAD BOUNDARY ESTIMATION APPARATUS AND TRAVELING ASSISTANCE SYSTEM USING SAME

(71) Applicant: Hitachi Automotive Systems, Ltd., Hitachinaka-shi, Ibaraki (JP)

(72) Inventors: Shinji Kakegawa, Tokyo (JP); Takeshi Nagasaki, Hitachinaka (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 159 days.

(21) Appl. No.: 16/301,782

(22) PCT Filed: Jul. 12, 2017

(86) PCT No.: PCT/JP2017/025356
§ 371 (c)(1),
(2) Date: Nov. 15, 2018

(87) PCT Pub. No.: WO2018/016394
PCT Pub. Date: Jan. 25, 2018

(65) Prior Publication Data
US 2019/0156129 A1 May 23, 2019

(30) Foreign Application Priority Data

Jul. 22, 2016 (JP) .................. 2016-143893

(51) Int. Cl.
*G06K 9/00* (2006.01)
*G08G 1/16* (2006.01)

(52) U.S. Cl.
CPC ..... *G06K 9/00798* (2013.01); *G06K 9/00805* (2013.01); *G08G 1/16* (2013.01); *G06T 2207/30256* (2013.01)

(58) Field of Classification Search
CPC .. G06K 9/00798; G06K 9/00805; G08G 1/16; G06T 2207/30256
See application file for complete search history.

(56) References Cited

U.S. PATENT DOCUMENTS

2012/0327189 A1* 12/2012 Muramatsu .............. G01C 3/06
348/46
2015/0367781 A1 12/2015 Takemae et al.

FOREIGN PATENT DOCUMENTS

EP 2 372 669 A1 10/2011
EP 2 779 025 A2 9/2014
(Continued)

OTHER PUBLICATIONS

Extended European Search Report issued in European Application No. 17830913.4 dated Feb. 24, 2020 (10 pages).
Hillel et al., "Recent Progress in Road and Lane Detection: A Survey", Machine Vision and Applications, Apr. 1, 2014, pp. 727-745, vol. 25, No. 3, XP055113665A1, (19 pages).
(Continued)

*Primary Examiner* — Casey L Kretzer
(74) *Attorney, Agent, or Firm* — Crowell & Moring LLP

(57) ABSTRACT

The present invention provides a traveling road boundary estimation apparatus that is capable of estimating the position and shape of a traveling road boundary highly reliably, and a traveling assistance system. The present invention has: a boundary feature map generation unit that generates, on the basis of an image acquired from an external sensor, a boundary feature map for storing a feature amount regarding the presence of a traveling road boundary, for each grid of the image or an image generated by converting the image into an image of another visual point; a boundary candidate setting unit that sets, as boundary candidates, a plurality of paths continuous in a depth direction from a coming-within-sight detection start-end position to a given detection tail end position, the positions both falling within a preset sensor view angle; a boundary likelihood evaluation unit that calculates, for each of the boundary candidates, a boundary (Continued)

likelihood evaluation value obtained by adding the feature amount of a relevant boundary feature map and a continuity evaluation value for the depth-direction together; and a traveling road boundary determination unit that determines a traveling road boundary by comparing the boundary likelihood evaluation values of the boundary candidates calculated by the boundary likelihood evaluation unit.

16 Claims, 12 Drawing Sheets

(56) References Cited

FOREIGN PATENT DOCUMENTS

| JP | 2009-298356 A | 12/2009 |
|---|---|---|
| JP | 2013-3800 A | 1/2013 |
| JP | 2014-175007 A | 9/2014 |
| JP | 2015-11619 A | 1/2015 |
| JP | 2016-9333 A | 1/2016 |

OTHER PUBLICATIONS

Thorpe et al., "Toward Autonomous Driving: The CMU Navlab Part I—Perception", DARPA/Vision & Navigation, IEEE Expert, Aug. 1, 1991, pp. 31-42, vol. 6, No. 4, Los Alamitos, CA, US, XP000243853, (12 pages).

Kuhnl T., "Road Terrain Detection for Advanced Driver Assistance Systems", May 21, 2013, pp. 1-152, XP055117968, (151 pages).

International Search Report (PCT/ISA/210) issued in PCT Application No. PCT/JP2017/025356 dated Oct. 31, 2017 with English translation (four (4) pages).

Japanese-language Written Opinion (PCT/ISA/237) issued in PCT Application No. PCT/JP2017/025356 dated Oct. 31, 2017 (five (5) pages).

Oniga et al., "Curb Detection Based on Elevation Maps From Dense Stereo", IEEE International Conference on Intelligent Computer Communication and Processing, 2007, (7 pages).

Badino et al., "Free Space Computation Using Stochastic Occupancy Grids and Dynamic Programming", Workshop on Dynamic Vision, ICCV, 2007, pp. 1-12, (12 pages).

\* cited by examiner

FIG. 7A
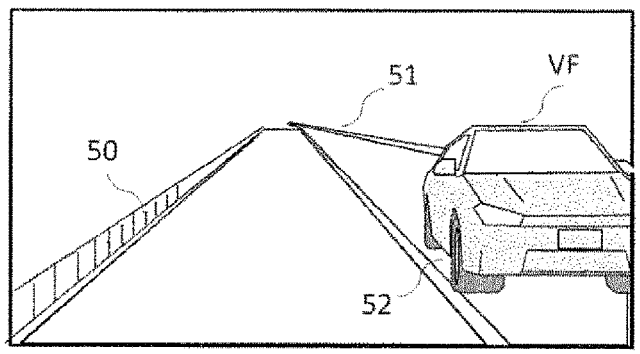
FIG. 7C
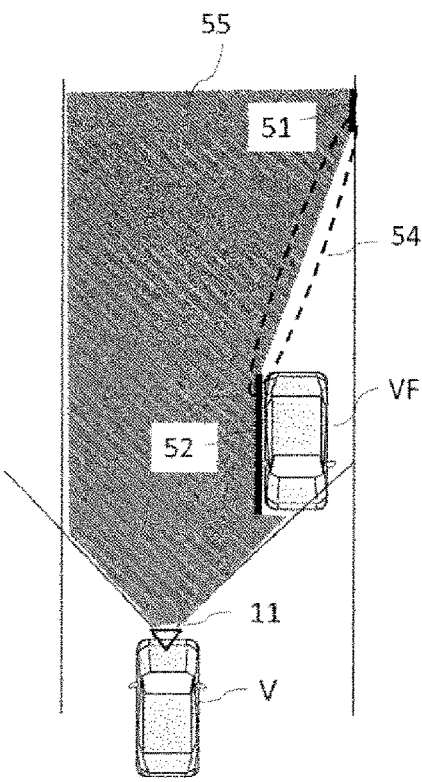
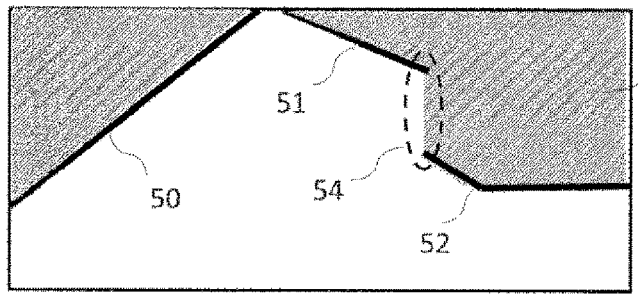
FIG. 7B
FIG. 8
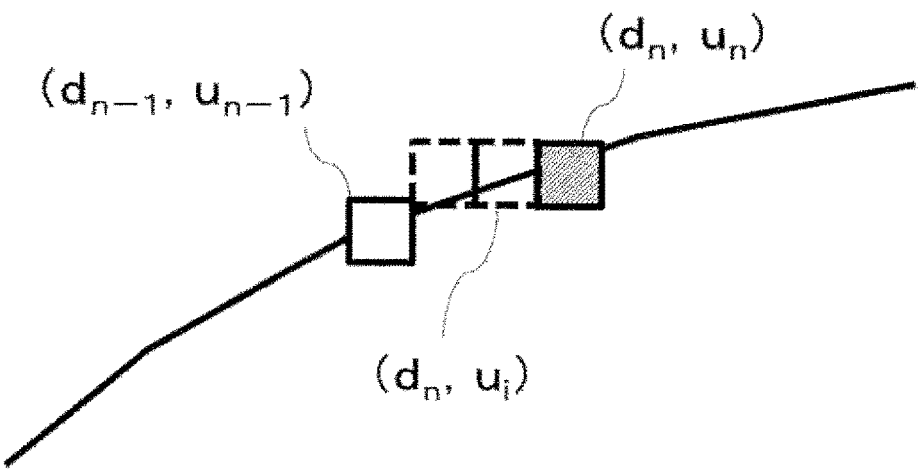

FIG. 13A
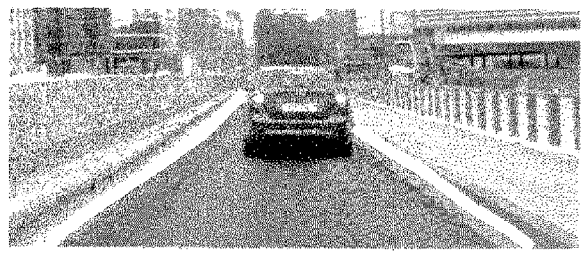
FIG. 13B
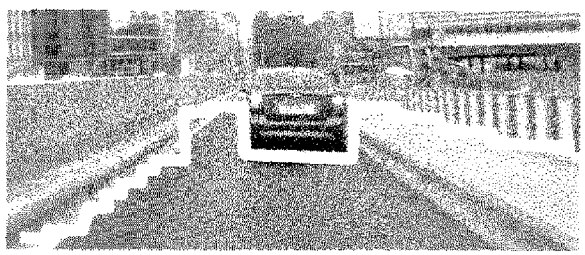
 
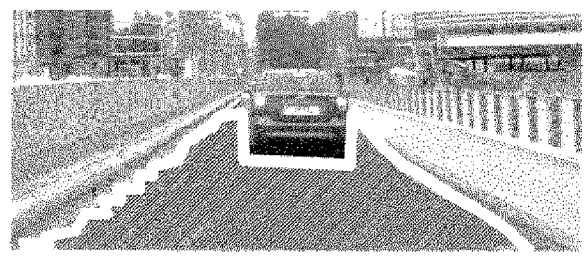
FIG. 13C

TRAVELING ROAD BOUNDARY ESTIMATION APPARATUS AND TRAVELING ASSISTANCE SYSTEM USING SAME

TECHNICAL FIELD

The present invention relates to a traveling road boundary estimation apparatus and a traveling assistance system using the same.

BACKGROUND ART

A traveling road boundary represents a boundary that distinguishes a travelable area and a non-travelable area. The travelable area here indicates an area in which a subject vehicle can travel safely without a collision with an obstacle or a deviation from a road. The traveling road boundary viewed from the subject vehicle can be regarded as a boundary with an end portion of the road (typically composed of structures such as a side wall, a guardrail, and a curbstone, but in some cases, no structures are present such as a case where simply gravel is present) or an obstacle (e.g., vehicle, bicycle, pedestrian) on the road.

It is important to grasp the traveling road boundary appropriately using an external sensor installed in the vehicle. Conventionally, there has been recognized, as a useful function for preventing a traffic accident, advanced driving assistance systems (ADAS) functions such as lane departure prevention (LDP) that provides warning and vehicle control by detecting a lane marker using an onboard camera when it is about to deviate from a lane, and a lane keep system (LKS) that constantly controls a vehicle so that the vehicle is kept in the position of center of a lane.

However, there are cases where a white line is not necessarily clearly visible due to a road condition, a weather condition, and the like, and cases where a white line is not originally painted, and the function does not operate in such cases. If the traveling road boundary that is a boundary with the end portion of the road and the obstacle can be appropriately estimated, it becomes possible to provide a function of preventing deviation of the road even in such cases. In addition, it is also important from the viewpoint of an elemental technology for autonomous driving, which is being developed for practical use recently. Based on information associated with the travelable area, it becomes easy to plan a safe path autonomously and to achieve the function of autonomous driving without a driver intervention.

Conventionally, a plurality of techniques for estimating a traveling road boundary has been known. In the prior art document 1 and PTL 1, a method of estimating a traveling road boundary by fitting a straight line at a position having a height difference between the inside and the outside of a boundary is disclosed.

Besides, in the prior art document 2, a method of estimating a traveling road boundary as an optimization issue for searching a path that minimizes cost in a certain cost space is disclosed. In the literature, it is described that "In polar representation, the task is now to find the first occupied cell. The first visible obstacle in the positive direction of depth will be found. All the space found before the cell is considered free space.", and "every row is not considered independently, but as part of a global optimization problem that is optimally solved". Here, "every row" indicates a distance of the first occupied cell corresponding to each line of sight of a camera. In this manner, the traveling road boundary passing through a position of an obstacle on the near side when viewed from a sensor (i.e., subject vehicle) and connected in the transverse angle direction of the sensor is estimated.

Moreover, PTL 2 discloses a means to solve the right and left traveling road boundary positions extending in the longitudinal direction of an image as an optimization issue on the basis of a feature amount similar to an edge of an image called a monogenic signal in order to appropriately detect the travelable area even in a case where the boundary is unclear. In this literature, it is described that "when constituting a path by consecutively connecting each point, it is considered that a path in which the direction in which each point continues is out of the inclination limitation is not the boundary of the travelable area, whereby a cumulative cost of such a path is not calculated". Further, it is described that "a boundary along a linear element in the image can be easily adopted by adding, at the time of accumulation, the cost corresponding to the angle formed by a local direction vector and each path at the time of searching an optimum path". In this manner, there is described a means for setting an inclination limitation on the path taken by the traveling road boundary or setting a cost according to the inclination.

CITATION LIST

Patent Literature

PTL 1: JP 2016-9333 A
PTL 2: JP 2013-3800 A

Non-Patent Literature

NPL 1: "Curb Detection Based on Elevation Maps from Dense Stereo", F. Oniga, et al., IEEE International Conference on Intelligent Computer Communication and Processing, 2007

NPL 2: "Free Space Computation Using Stochastic Occupancy Grids and Dynamic Programming", H. Badino, et al., Workshop on Dynamic Vision, ICCV, 2007

SUMMARY OF INVENTION

Technical Problem

However, in the approach of fitting a traveling road boundary with a simple straight line or a curve model as in the prior art document 1 and PTL 1, in a case where a traveling road boundary is discontinuous and takes a complex shape, there may be a problem that a boundary position is erroneously detected or not detected.

In a case where only the end portion of the road is visible in front of the sensor, the traveling road boundary is likely to be a shape extending continuously and monotonically in the depth direction, and in a case where an obstacle on the road partially blocks the end portion of the road in the sensor view angle, or in a case where the shape of the end portion of the road is originally a discontinuous shape, it takes a discontinuous and complex shape. Examples of the former case include a case where a vehicle on the road, a bicycle, and a pedestrian exist. Examples of the latter case include a case where the end portion of the road is composed of a structure intermittently disposed such as a pole and a pylon, a case where the end portion of the road is composed of natural materials such as an embankment and grass formed by soil and snow so that there are variations in the lateral position of the end portion, and a case where the boundary does not exist partially or the boundary is not visible from the sensor at places such as an intersection and a branch of the road.

Hereinafter, the end portions of various kinds of roads as described above, and the end portions of the obstacle on the road that blocks the end portion of the road are collectively referred to as a road edge. In addition to being likely to take the complex shape as described above, the road edge tends to be an object with a feature weaker than objects to be detected by obstacle detection and lane detection so that the boundary position tends to be ambiguous. From the viewpoint of the feature of 'distance', it is difficult to distinguish from the road surface at the road edge with a low height such as a curbstone, which is a feature weaker than an obstacle on the road such as a vehicle and a pedestrian. From the viewpoint of the feature of 'image shading' as well, it is difficult to distinguish from the road surface as a sharp edge of the shading is not at the boundary position, which is a feature weaker than the lane marker.

As described above, it is required to estimate the traveling road boundary at the road edge position in which the boundary tends to take a discontinuous and complex shape and the feature amount of the boundary tends to be poor from the viewpoint of the distance and also from the view point of the image. Meanwhile, since reliability of the result is considered to be lowered in a case where the boundary becomes ambiguous as described above, it is considered to be important that only the estimated position of a section in which a certain degree of reliability can be secured is output. The problems of the prior art will be further described based on such a premise.

In the prior art document 2, the position and the feature amount of the obstacle are expressed by an occupancy grid map, and the traveling road boundary is expressed as a path connecting the grid positions of the occupancy grid map generated from a distance image, whereby a discontinuous and complex boundary shape can also be expressed. However, there may be a problem that, while the boundary is not estimated at a position of the road edge having a low height, such as a curbstone, in which a distance feature of the obstacle is small, the boundary tends to be estimated at a position of a large obstacle on the far side. Moreover, since the continuous boundary line is continuously estimated in the transverse angle direction of the sensor, there may be a problem that it is impossible to estimate only the boundary of the highly reliable section in a case where the boundary is ambiguous and the reliable is lowered.

In PTL 2, it is considered that the estimation of the traveling road boundary extending in the depth direction is stabilized by setting the inclination limitation on the path extending to image longitudinal Europe visit taken by the traveling road boundary or setting the cost according to the inclination. However, since the shape continuously extending in the longitudinal direction of the image is estimated, there may be a problem that it is impossible to estimate only the boundary of the highly reliable section in a case where the boundary is ambiguous and the reliable is lowered.

The present invention has been conceived in view of the problems described above, and an object of the present invention is to provide a traveling road boundary estimation apparatus capable of estimating a highly reliable traveling road boundary position and a shape even in a case where there is a road edge having a weak distance feature or a weak image shading feature or a case where a road edge takes a discontinuous shape, and a traveling assistance system using the same.

Solution to Problem

In order to address the object mentioned above, the configurations described in the claims are adopted.

Advantageous Effects of Invention

According to the present invention, a boundary feature map that stores a feature amount of a traveling road boundary in each grid of an image is generated, a plurality of traveling road boundary candidates continuous in a depth direction from a coming-within-sight detection start-end position to a given detection tail end position is set, both positions falling within a preset sensor view angle, and a candidate in which a boundary likelihood evaluation value is maximized, which is calculated by adding a feature amount of the boundary feature map corresponding to a boundary shape of each traveling road boundary candidate and a continuity evaluation value in the depth direction, is determined to be the traveling road boundary. Therefore, it becomes possible to estimate a highly reliable traveling road boundary position and a shape even in a case where there is a road edge having a weak distance feature or a weak image shading feature or a case where the road edge takes a discontinuous shape.

Problems, configurations, and effects other than those described above will be clarified in the following descriptions of the embodiments.

BRIEF DESCRIPTION OF DRAWINGS

FIGS. 7A to 7C are views illustrating a boundary with a blind spot area.

FIG. 8 is a diagram illustrating a grid position referring to a boundary feature amount on a local path.

FIGS. 13A to 13C are views illustrating an overview of a travelable area setting unit.

DESCRIPTION OF EMBODIMENTS

Hereinafter, embodiments of the present invention will be described with reference to the accompanying drawings.

First Embodiment

Figure 2:
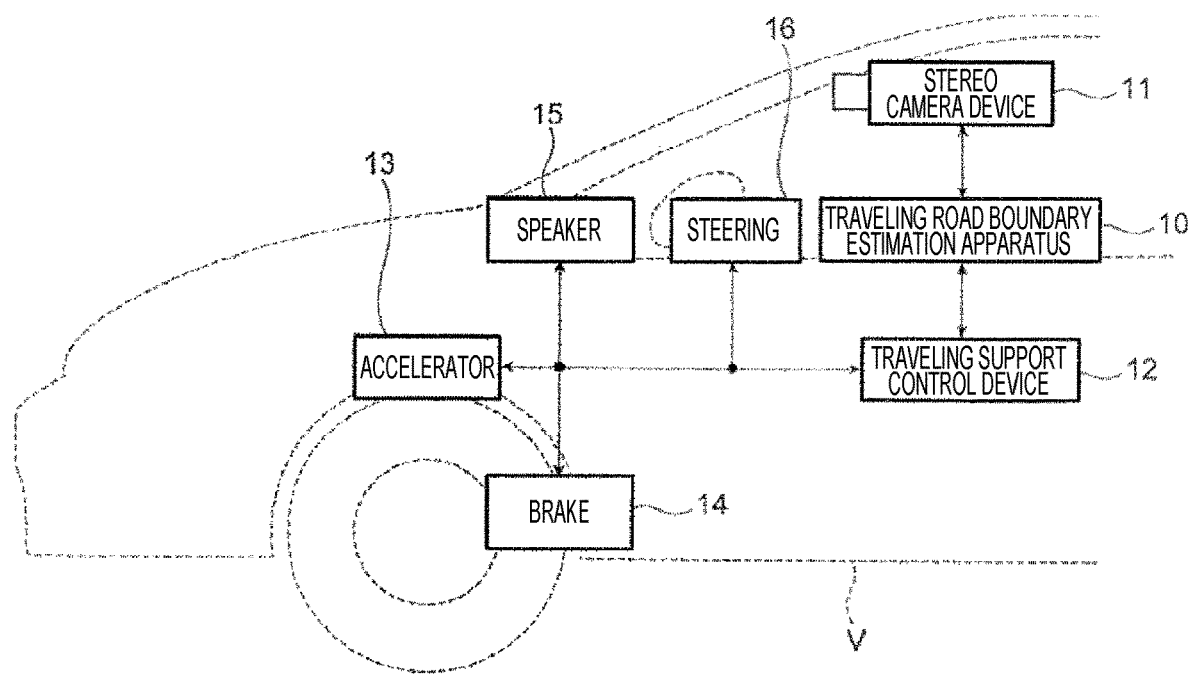
FIG. 2 is a system schematic diagram according to the present embodiment.

FIG. 2 schematically illustrates a system configuration of a traveling assistance system to which a traveling road boundary estimation apparatus according to a first embodiment of the present invention is applied.

The illustrated traveling assistance system 1 is mounted on a vehicle V such as an automobile, and mainly includes a stereo camera device 11 including a plurality of (two in the present embodiment) cameras, a traveling road boundary estimation apparatus 10 that recognizes a traveling road boundary around the vehicle V from a plurality of images captured by the respective cameras of the stereo camera device 11 in synchronization with each other, and a traveling support control device 12 that supports traveling of the vehicle V by controlling, on the basis of an estimation result of the traveling road boundary estimation apparatus 10, various devices (e.g., accelerator 13, brake 14, speaker 15, and steering 16) mounted on the vehicle V.

The stereo camera device 11 is installed in front of an upper part of a windshield of the vehicle V toward the front of the vehicle V, for example, and includes a left camera and a right camera as a pair of image capturing units that captures the front of the vehicle V and obtains image information. The respective left camera and the right camera include an image pickup element such as a charge coupled device (CCD) and a complementary metal oxide semiconductor (CMOS), and are installed to image the front of the vehicle V from the positions spaced apart from each other in a vehicle width direction (lateral direction).

The traveling road boundary estimation apparatus 10 is a device that estimates a traveling road boundary on the basis of image information in an area to be imaged in front of the vehicle V obtained by the stereo camera device 11 in a time series at a predetermined cycle, and in particular, a device that estimates a traveling road boundary at a position of an end portion of a road having a height such as a guardrail, a side wall, a curbstone, an embankment, and grass extending in a depth direction at positions of both sides of the vehicle or at a position of a lateral edge of an obstacle on a road located in a lateral direction of the vehicle V, and outputs a result of the estimation to the traveling support control device 12. The traveling road boundary estimation apparatus 10 includes a camera control unit that controls the stereo camera device (for example, controls an imaging timing and an exposure amount of the right camera and the left camera), a random access memory (RAM) that is a temporary storage area, a read only memory (ROM) that stores a program and various initial values, a central processing unit (CPU) that controls the entire system, an external interface (IF) that outputs recognized information and the like outside the system, an image processing large scale integration (LSI), and the like, and each constituent element is communicably connected via a bus.

On the basis of the result of the traveling road boundary estimation received from the traveling road boundary estimation apparatus 10, the traveling support control device 12 operates the speaker 15 of the vehicle V, and calculates an accelerator control amount, a brake control amount, and a steering control amount for supporting the traveling of the vehicle V to adjust the accelerator 13, the brake 14, the steering 16, and the like.

Figure 1:
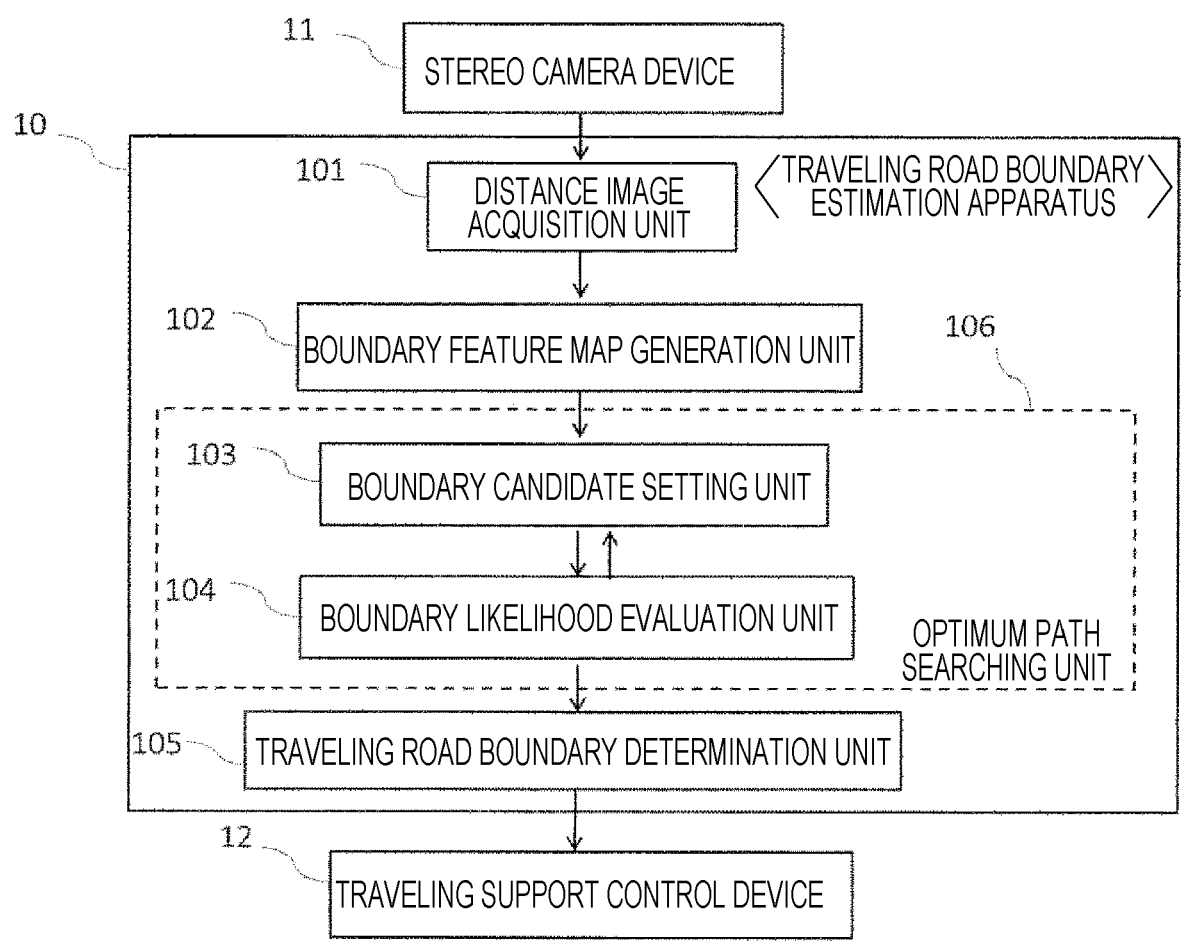
FIG. 1 is a representative diagram of the present patent.

FIG. 1 specifically illustrates an internal configuration of the traveling road boundary estimation apparatus illustrated in FIG. 2. Hereinafter, a means for estimating the traveling road boundary existing in front of the vehicle V using the traveling road boundary estimation apparatus 10 will be specifically described.

As illustrated in FIG. 1, the traveling road boundary estimation apparatus includes a distance image acquisition unit 101, a boundary feature map generation unit 102, an optimum path searching unit 106, and a traveling road boundary determination unit 105.

Further, the optimum path searching unit 106 includes a boundary candidate setting unit 103, and a boundary likelihood evaluation unit 104.

The distance image acquisition unit 101 generates, using an image of the right camera and an image of the left camera obtained from the stereo camera device 11, a distance image (or parallax image) in which distance information to an object imaged by each pixel is stored in each pixel.

More specifically, the distance image generation unit 101 divides one image (e.g., left image) to include a plurality of pixels by a first block having a predetermined shape, divides the other image (e.g., right image) by a second block having a size, a shape, and a position same as the first block, and calculates a correlation value for two luminance patterns in the first block and the second block at each position after shifting the second block by one pixel in the lateral direction, thereby searching a position where the correlation value is the lowest, in other words, a position with the highest correlation (corresponding point search).

As a method of calculating the correlation value, for example, the sum of absolute difference (SAD), the sum of squared difference (SSD), the normalized cross correlation (NCC), a gradient method, and the like can be used. In a case where a position at which the correlation becomes the highest is specified as a result of the searching, a distance between a specific pixel in the first block and a specific pixel in the second block at the specified position is calculated as parallax, which is set to be one step, and a similar step is executed for all pixels, whereby the distance image can be generated.

Figure 3:
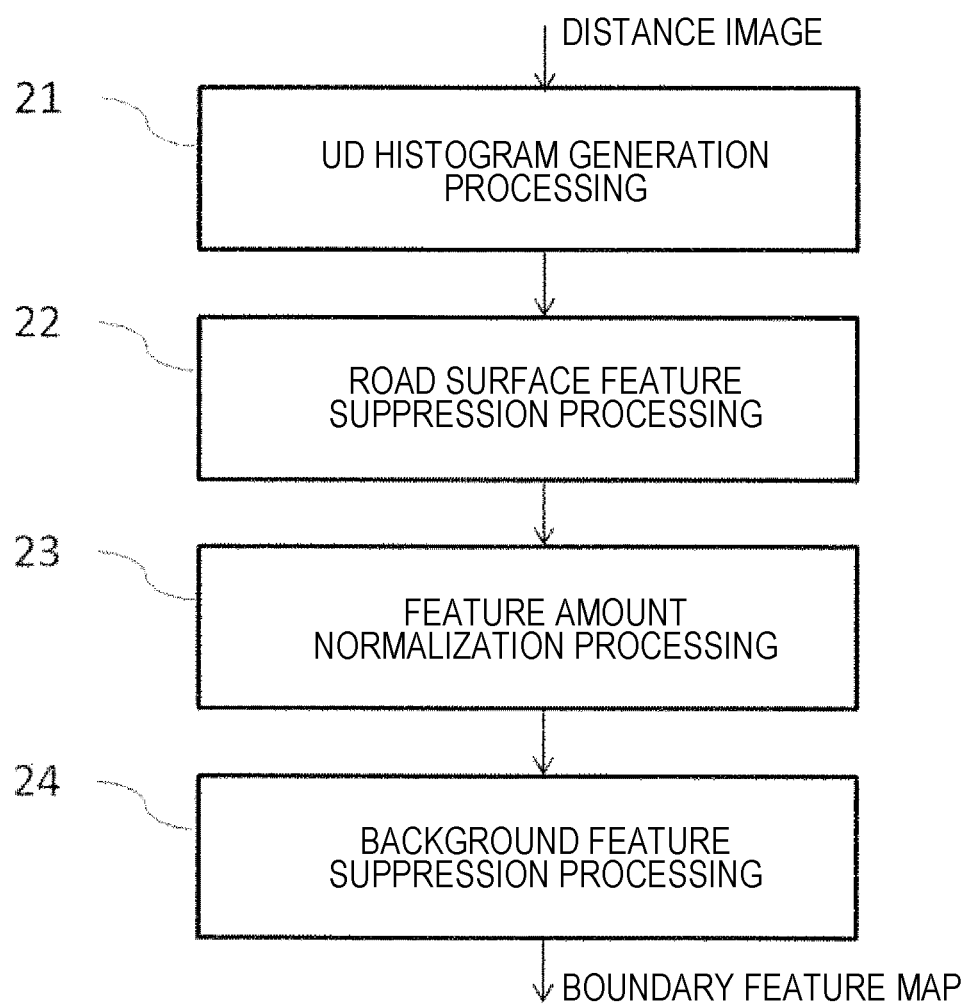
FIG. 3 is a diagram illustrating a processing flow of a boundary feature generation unit.
Figure 4A:
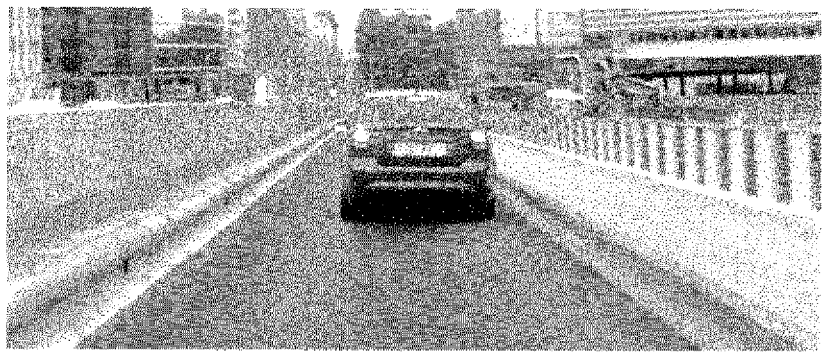
FIGS. 4A to 4D are views illustrating a processing result of the boundary feature generation unit.
Figure 4B:
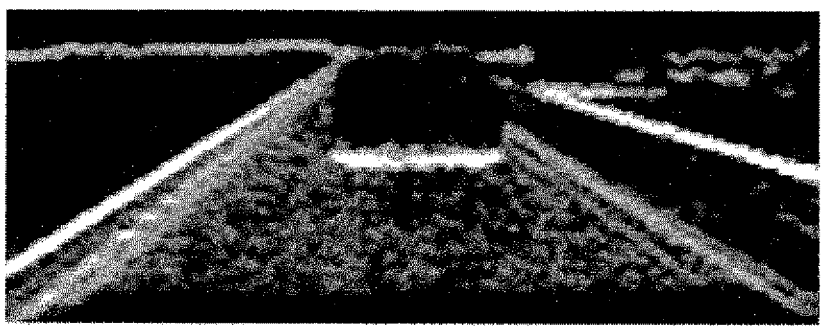
Figure 4C:
Figure 4D:
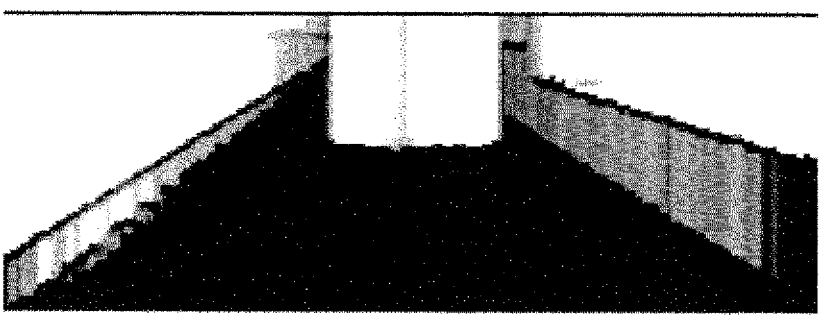

The boundary feature map generation unit 102 generates a boundary feature map storing a feature amount of a boundary for each grid of an image in a space where the front space of the stereo camera device 11 is viewed from above. FIG. 3 illustrates a flowchart.

UD histogram generation processing 21 is processing for generating a UD histogram that stores a feature amount of an obstacle at each distance. The UD histogram is a feature amount of an obstacle generally used for detecting an obstacle using a stereo camera, and is used as a feature amount of a boundary by further processing this feature amount.

Road surface feature suppression processing 22 is processing for subtracting the feature amount of the above-mentioned obstacle corresponding to a road surface position such that the feature amount of the boundary at the position of the road surface becomes generally a negative value. Feature amount normalization processing 23 is processing for normalizing the feature amount by performing processing such that the feature amount having been subject to the road surface feature suppression processing 22 falls within a predetermined value or less, whereby the feature amount of the obstacle having a certain height or more becomes the feature amount similar to the feature amount of the obstacle having the certain height.

Background feature subtraction processing 24 is processing for further subtracting the feature amount at the position that becomes a background of the obstacle such that the feature amount is suppressed on the basis of the feature amount having been subject to the feature amount normalization processing 23. As a result, the feature amount is processed to be generally a negative value at the grid position, which is the background of the obstacle existing on the near side and has a feature amount smaller than the obstacle on the near side.

Conversion is performed in the road surface feature suppression processing 22 and the background feature subtraction processing 24 such that a negative feature amount at the background and the road surface position of the obstacle can be easily taken. This is because the negative feature amount is preferable at the background and the road surface position of the obstacle, which is to be an erroneous estimation when it is estimated to be a traveling road boundary, as an evaluation value of boundary likelihood is calculated on the basis of the feature amount by the boundary likelihood evaluation unit 104 as subsequent processing and a boundary shape is determined at the position where the evaluation value is the highest by the traveling road boundary determination unit 105. The order of executing the road surface feature suppression processing, the feature amount normalization processing, and the background feature originating processing may vary, and may be executed in a different order. Each processing will be described in detail below.

In the UD histogram generation processing 21, first, each pixel of the distance image is scanned, and a distance measurement number is stored in a grid of an image space (hereinafter referred to as UD space) at an image lateral position u with an ordinate axis representing a parallax d, which corresponds to a three-dimensional position of the object measured in each pixel, thereby generating a UD histogram. This is similar to the occupied grid map disclosed in the prior art document 2. A high distance measurement number in an arbitrary grid suggests that a large obstacle is present at the position indicated by the grid coordinates. This is because the distance measurement number that is the same distance increases on the obstacle surface perpendicular to the road surface.

Next, in the road surface feature suppression processing 22, the feature amount is converted such that the boundary feature generally takes a negative value in the distance (parallax) corresponding to the road surface. At the corresponding to the road surface, in a case where no obstacle standing vertically exists or the feature amount of the obstacle is small as the height of such a stepped surface is minute, the measured number of the distance corresponding to the road surface is mixed to a certain extent for each grid and generally takes a value larger than zero, and in addition to that, in a case where the small step is considered to be the road surface, the feature amount corresponding to the height of the vertical surface of the small step is observed. In order to convert the feature amount to take generally a negative value at a position regarded as a road surface having such feature, for example, with respect to the feature amount of each grid, a value corresponding to an expected value of the feature amount observed at the road surface position is subtracted first, and in a case where the feature amount becomes negative by that, processing for setting the feature amount to zero is performed. Then, processing for simply subtracting the value of each grid by a predetermined value is performed.

Next, in the feature amount normalization processing 23, the feature amount is converted such that the obstacle having a certain height or more becomes the feature amount having a similar boundary likelihood. Accordingly, in a case where the value of each grid is higher than a predetermined value, for example, threshold processing is performed so that the value becomes the predetermined value. By converting the feature amount in this manner, it becomes possible to prevent the traveling road boundary from preferentially being estimated at a boundary such as a side wall that is high in height and rich in feature compared with a boundary with a curbstone that is low in height and poor in feature. For example, in a case where there is a side wall on the far side of a curbstone on the forefront side, which is an obstacle, an effect is exerted to prevent a situation in which the traveling road boundary is erroneously estimated at the position of the side wall on the far side, not at the position of the curbstone on the forefront side. It can be said that it is more reasonable to consider the obstacle having a certain height or more to have a feature of a similar boundary likelihood. Therefore, normalization processing of such feature amount is important.

Next, in the background feature subtraction processing 24, the feature amount is converted in such a manner that a negative value is easily taken at a position on the far side from an obstacle on the forefront side (hereinafter referred to as forefront obstacle) viewed from a sensor. Therefore, in a case where the value of each grid is higher than a predetermined value, for example, processing is performed to subtract the value of a grid on the far side from the grid by a value corresponding to the feature amount of the grid.

By converting the feature amount in this manner, in a case where there is a road edge on the near side having a feature amount similar to that of a road edge on the far side, an effect is exerted such that the boundary can be easily estimated at the position of the road edge on the near side.

FIG. 4(*c*) illustrates an exemplary boundary feature map obtained as described above. A black grid indicates that the feature amount is zero, and the closer to the white color, the larger the value taken as the feature amount becomes.

In the drawing, (a) illustrates an original image, and (b) illustrates a UD histogram (feature amount of the obstacle) obtained by the UD histogram generation processing 21. By comparing (b) and (c), it can be seen that the feature of the road surface is suppressed and the feature of the background is suppressed in the boundary feature map. (d) illustrates a map in which the degree of the negative value of the boundary feature map is visualized. The black color indicates zero or a positive value, and the closer to the white color, the larger the negative value is. As can be seen from the drawing, in the boundary feature map, the feature amount on the far side takes a negative value according to the feature amount of the obstacle on the near side.

The optimum path searching unit 106 includes the boundary candidate setting unit 103, and the boundary likelihood evaluation unit 104. The boundary candidate setting unit 103 comprehensively sets a path (local path) connecting the respective grids of the boundary feature map between adjacent lines in the parallax direction, and further comprehensively sets a cumulative path combining the local paths. The boundary likelihood evaluation unit 104 calculates a local score and a cumulative score representing the boundary likelihood of the local path and the cumulative path. In the present embodiment, as the processing of the boundary candidate setting unit 103 and the processing of the boundary likelihood evaluation unit 104 are practically performed simultaneously, they will be collectively described as the processing of the optimum path searching unit 106 in the following descriptions.

Concretely, optimum path searching will be described in detail. In a coordinate system of the boundary feature map as illustrated in FIG. 5, the local path is set at each position in the order from a lower end $d_{start}$ (vicinity side) to an upper end $d_{end}$ (farther side) in the parallax direction, and the local score thereof is calculated. The cumulative path to the corresponding position is further set, and the cumulative score thereof is calculated. By repeating such processing for each line, an optimum path is searched.

Figure 5A:
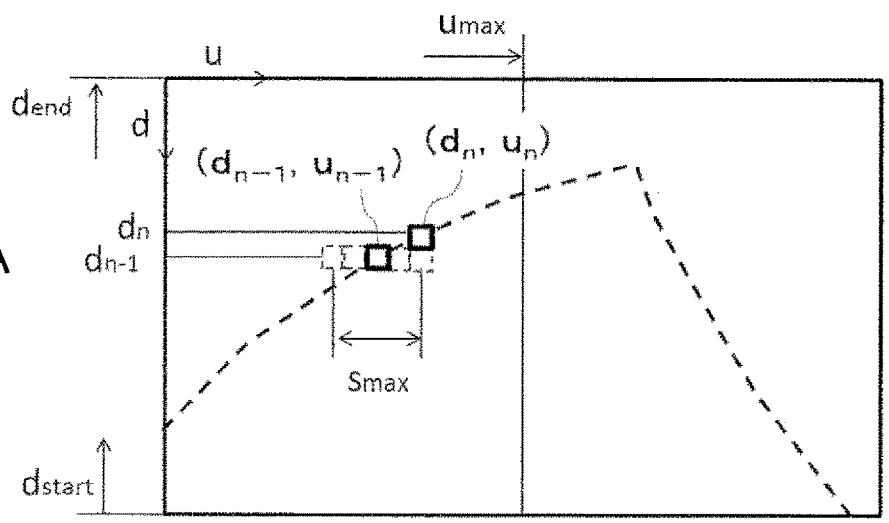
FIGS. 5A and 5B are graphs illustrating an overview of an optimum path searching unit.
Figure 5B:
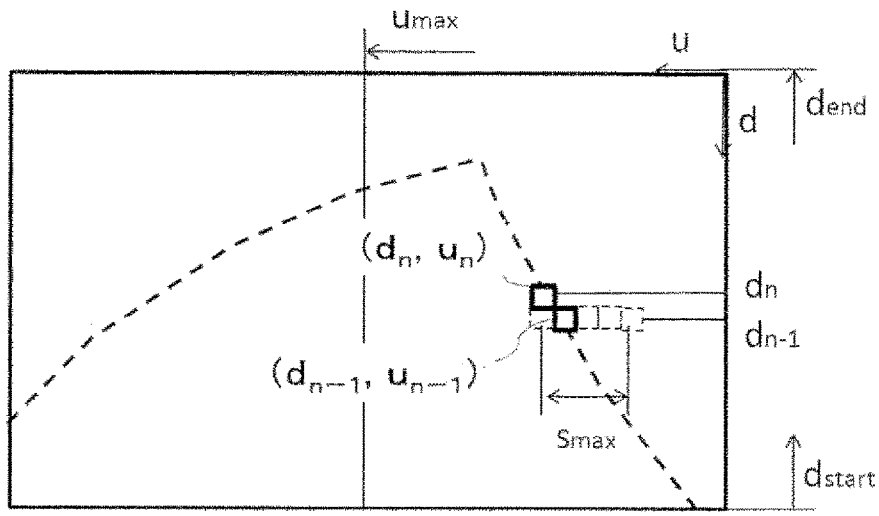

In FIG. 5, a grid of an adjacent line that can be connected to an arbitrary grid ($d_n$, $u_n$) is limited within the range indicated by $s_{max}$, and one of those candidates is illustrated as ($d_{n-1}$, $u_{n-1}$). In addition, each of FIGS. 5(a) and 5(b) illustrates that a search range in the lateral direction and a manner of taking a coordinate u are different in the optimum path search of a left traveling road boundary and a right traveling road boundary.

With respect to the search range in the lateral direction, it is only necessary to set a region where left and right road boundaries are highly likely present, and simply, as illustrated in the drawing, it may be respectively set on the left side and the right side from an image center position.

Since the right traveling road boundary and the left traveling road boundary are to be estimated independently and there is no calculational difference other than the difference of the search range in the lateral direction and the manner of taking the coordinate u, the left and right road boundaries are not distinguished in the formulae to be present in the following descriptions.

Figure 6:
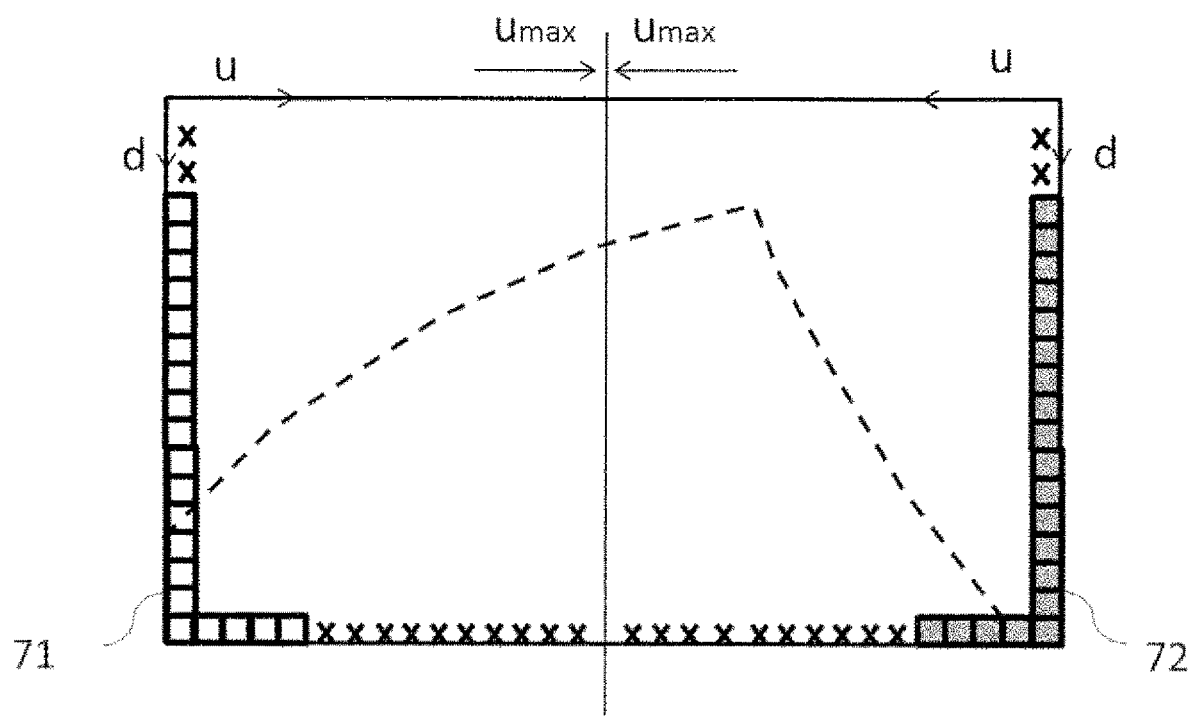
FIG. 6 is a graph illustrating setting of a detection start-end position in the optimum path searching unit.

Further, FIG. 6 illustrates an exemplary setting of a detection start-end position of the traveling road boundary. On the edge of the image, the detection start-end positions of the left traveling road boundary and the right traveling road boundary of respective boundary candidates are denoted by '□', 71, and 72 in the drawing, and a grid denoted by '×' indicates that it is not the detection start-end position.

The local score at the lowermost end of each boundary candidate is calculated in the local path passing through the grid denoted by the detection start-end positions 71 and 72. Meanwhile, in the local path connected to the grid denoted by '×', $p_\infty$ is substituted into the local score, which means an impossible path. All local paths connected to the local path determined to be the impossible path are set as impossible paths, whereby the traveling road boundary with the grid denoted by '×' as the start-end position is set not to be detected. A range of the detection start-end position can be determined on the basis of specification regarding a vicinity side limit and a farther side limit of the road edge position to be detected and a sensor parameter regarding a sensor view angle.

Further, in a case where a gradient of the local path $s=u_n-u_{n-1}=0$ is satisfied, it is indicated that the local path is extending in the line of sight direction of the sensor, which indicates the possibility that the local path is a path passing through the boundary of a blind spot area.

In FIG. 7, descriptions will be made using conceptual diagrams of a boundary feature map (b) of the UD space corresponding to an image (a) of a sensor viewpoint and an image (c) viewed from above corresponding thereto. FIG. 7 illustrates a scene in which road boundaries 50 and 51 and an edge 52 of an oncoming vehicle VF are visible as road edges. The road edges 50, 51, and 52 indicate that the boundary feature amount is large in the boundary feature map (b) with a black line. In addition, since a hatching area 53 is the background of the forefront obstacle, it indicates an area in which the boundary feature amount takes a negative value. In the image (c) viewed from above, a hatching area 55 indicates an area of the road surface visible to the stereo camera device 11 mounted on the vehicle V. A boundary 54 of the dotted line portion indicates a traveling road boundary portion that satisfies the gradient s=0 in the boundary feature map (b), and it indicates a boundary of the blind spot area in the corresponding image (c) viewed from above. The boundary 54 with the blind spot area is not the boundary with the road edge, and is a boundary connecting the boundary at the road edge 52 on the foreground side and the road edge 51 on the background side that are discontinuous due to the presence of the obstacle. It is considered that the boundary denoted by 51, 52, and 54 as the right traveling road boundary is preferably estimated as a traveling road boundary. Therefore, in a case where the gradient s=0 and a certain condition are satisfied, it is determined to be a path passing through the boundary with the blind spot area, and the local score is calculated with a calculating formula different from the case other than the case mentioned above.

The local score of an arbitrary local path is calculated using the following calculating formula in a case where the path is not determined to be the boundary with the blind spot area.

[Formula 1]

$$dJ(d_n,u_n,d_{n-1},u_{n-1})=g(d_n,u_n,u_{n-1})-\rho_s(d_n,u_n,u_n-u_{n-1})-\rho_g(d_n,u_n,d_{n-1},u_{n-1}) \quad (1)$$

Here, the first term of the formula (1) represents a score (that can be positive or negative) corresponding to the boundary feature on the local path, the second term represents a negative score corresponding to the deviation from the expected value of the gradient in the local path, and the third term represents a negative score corresponding to a gap length in the cumulative path including the local path. The gap length indicates a distance in which the traveling road boundary is considered not to be continuous in the depth direction as the sufficient boundary features are not continuous in the depth direction.

The local score is calculated using the following calculating formula in a case where the path is determined to be the boundary with the blind spot area.

[Formula 2]

$$dJ(d_n,u_n,d_{n-1},u_{n-1})=-\rho_b(d_n,d_{n-1},u_{n-1}) \quad (2)$$

Here, the first term of the formula (2) represents a negative score corresponding to a length of the blind spot area in the cumulative path including the local path.

It is assumed that a criterion for determining the path as the boundary of the blind spot area satisfies the following two conditions.

1) When the gradient of the local path is zero. In other words,

2) When it has the boundary feature. In other words, $$UD(d_n,u_n)<c_{b1}, \text{ and } c_{b1}<UD(d_n,u_n+1)<c_{b2} \quad \text{[Formula 3]}$$

3) When it has the boundary feature representing the background of the obstacle at the grid position corresponding to the local path, and has the boundary feature representing the road surface at the adjacent lateral position of the grid. In other words, $$UD(d_n,u_n)<c_{b1}, \text{ and } c_{b1}<UD(d_n,u_n+1)<c_{b2} \quad \text{[Formula 4]}$$

Here, UD (d, u) indicates the boundary feature amount at the corresponding position in the boundary feature map. Further, $c_{b1}$ and $c_{b2}$ are threshold values indicating the background of the obstacle and the range of the boundary feature amount on the road surface, respectively.

Next, the cumulative score [$d_n$, $u_n$] is calculated using the recurrence formula represented by the following formula (3) on the basis of the local score calculated by the formulae (1) and (2) and the cumulative score [$d_{n-1}$, $u_{n-1}$] calculated in the previous line.

[Formula 5]

$$J[d_n,u_n]=\max\{J[d_{n-1},u_{n-1}]+dJ(d_n,u_n,d_{n-1},u_{n-1})| \\ 0\leq u_n-u_{n-1}\leq s_{max}\} \quad (3)$$

Since $J[d_{n-1}, u_{n-1}]$ is not defined in the initial path connected to the grid at the image end (left and right ends and lower end) in the UD space, in this case, it is set to be $J[d_{n-1}, u_{n-1}]=0$. The cumulative score $J[d_i, u_i]$ calculated at each position in the UD space passes through one of the preset detection initial positions, and means a score of the optimum path of a case where $(d_i, u_i)$ is set to be a detection tail end position. The cumulative score $J[d_i, u_i]$ at each position is stored as an array, and an optimum path having an arbitrary position as a tail end position is determined in the traveling road boundary determination unit 105 as subsequent processing. At this time, in order to restore the position of each path taking the optimum path, the position of $u_{n-1}$ at the time when $J[d_n, u_n]$ in the grid $(d_n, u_n)$ becomes the maximum value at the timing of calculating the formula (3) is kept in the array as $u_{n-1}*[d_n, u_n]$.

In this manner, the optimum path searching unit 106 calculates the local score of the local path on the basis of the formulae (1) and (2), calculates the cumulative score of the cumulative path on the basis of the formula (3), and searches for an optimum path line by line while keeping only the cumulative path with the maximum cumulative score in each grid. That is, in the formula (3), since the path that passes through the same grid position at each grid position but does not have the maximum cumulative score is rejected from the boundary candidate as there is no possibility of becoming the optimum path from the principle of optimality, in a comprehensive search, the search can be advanced without explosion of combinations.

Besides, at the time of calculating the cumulative score with the formula (3), information necessary to calculate a score corresponding to the gap length and a score corresponding to a length of the blind spot area using the formulae (1) and (2) is updated using the following formula.

1) Update of information related to the gap length:

[Formula 6]

$$\text{if } J[d_n, u_n] > 0, \text{ and } g_{acc}[d_{n-1}, u_{n-1}*] + UD(d_n, u_n) \leq 0:$$
$$d_g[d_n, u_n] = d_g[d_{n-1}, u_{n-1}*], g_{acc}[d_n, u_n] = g_{acc}[d_{n-1}, u_{n-1}*] \quad (4)$$

otherwise:

$$d_g[d_n, u_n] = d_n, g_{acc}[d_n, u_n] = 0$$

2) Update of information related to the length of the blind spot area:

[Formula 7]

$$\text{if } u_n - u_{n-1}* = 0, \text{ and } UD(d_n, u_n) < c_{b1}, \text{ and}$$
$$c_{b1} < UD(d_n, u_n+1) < c_{b2}: d_b[d_n, u_n] = d_b[d_{n-1}, u_{n-1}*] \quad (5)$$

otherwise:

$$d_b[d_n, u_n] = d_n$$

Here, $u_{n-1}*$ represents a value of $u_{n-1}$ at the time when $J[d_{n-1}, u_{n-1}]+dJ$ is maximized in the formula (3). Further, $d_g[d, u]$ in the formula (4) is an array that stores an end distance (parallax) not having been determined to be a gap in the optimum path with the grid (d, u) as a tail end position, and $g_{acc}[d, u]$ is an array that stores a cumulative value of the boundary feature amount on the path from the tail end position not having been determined to be a gap to the grid (d, u). The formula (4) is mainly set in such a manner that it can be known later that, in a case where the cumulative value in the grid $(d_n, u_n)$ is zero or less, the grid $(d_n, u_n)$ is regarded as a gap and the gap length is increased by one unit, and in a case other than that, it is set to zero. Further, $d_b[d, u]$ in the formula (5) is an array that stores the end distance (parallax) not having been determined to be a blind spot area in the optimum path with the grid (d, u) as the tail end position. The formula (5) is set in such a manner that it can be known later that, in a case where the local path is determined to be the boundary with the blind spot area, the length of the blind spot area is increased by one unit, and in a case other than that, it is set to zero.

Next, details of the respective terms of the formulae (1) and (2) will be described. The first term of the formula (1) is concretely expressed by the following formula.

[Formula 8]

$$g(d_n, u_n, u_{n-1}) = UD(d_n, u_n) + \sum_{u_i \in [u_{n-1}+1, u_n-1]} UD(d_n, u_i) \quad (6)$$

Here, the first term and the second term of the formula (6) are the boundary feature amounts of the grid positions that are regarded as on the path in the local path connecting the grid $(d_n, u_n)$ and the grid $(d_{n-1}, u_{n-1})$, which indicates a cumulative value of the boundary feature amount of the grid position illustrated by hatched '□' and '□' of the dotted line in FIG. 8.

Next, the second term of the formula (1) is concretely expressed by the following formula.

[Formula 9]

$$\rho_s(d_n, u_n, s) = 0 \quad \text{if } \Delta s < t_{s1} \quad (7)$$
$$= p_s \cdot (\Delta s - t_{s1}) \quad \text{if } t_{s1} \leq \Delta s < t_{s2}$$
$$= p_s \cdot (t_{s2} - t_{s1}) \quad \text{if } t_{s2} \leq \Delta s$$

where $\Delta s = |s_{exp} - s|$, where $s_{exp} = (u_n - u_c - f\tan\phi)/d_n$

Figure 9A:
FIGS. 9A to 9C are views illustrating an exemplary expected value of a gradient.
Figure 9B:
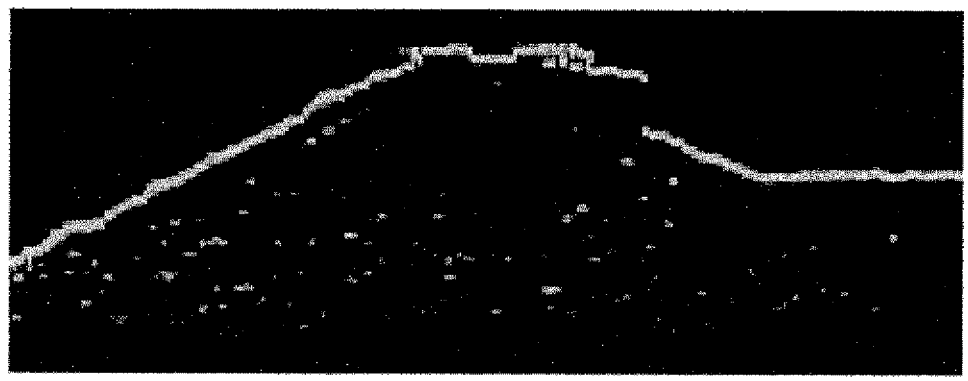
Figure 9C:
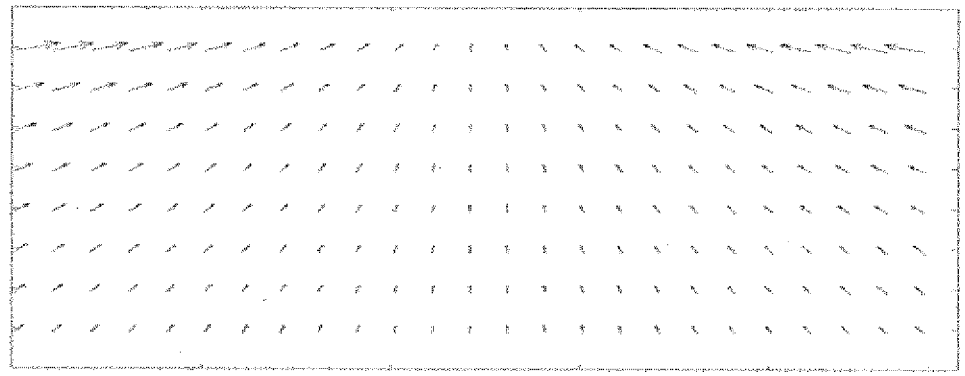

Here, $t_{s1}$ and $t_{s2}$ represent predetermined threshold values, $\Delta s$ represents a deviation between the gradient of the local path and its expected value $s_{exp}$, and $p_s$ represents a parameter providing a predetermined penalty according to the deviation of the gradient from the expected value. The expected value $s_{exp}$ is a gradient estimated at the grid position $(u_n, d_n)$ in a case where a straight road extending ahead of the vehicle is assumed, $u_c$ and f represent a main point (center point) position in the lateral direction of the camera and a focal point distance, respectively, and $\phi$ represents a yaw angle of the vehicle with respect to the straight road in a three-dimensional space. In a case where the yaw angle cannot be measured, a value simply calculated with $\phi=0$ may be used. Even in the case where a fixed value of $\phi=0$ is used, assuming a normal case of traveling along the road, the deviation is particularly small on the vicinity side, whereby it becomes an effective geometric constraint on the boundary shape. FIG. 9(c) illustrates an example in which a part of the direction of $s_{exp}$ calculated at each grid position in the case of $\phi=0$ is plotted with arrows. (a) and (b) in the drawing are corresponding original image and a boundary feature map. As can be seen from the drawing, the direction of the road edge (guardrail and lateral edge of the vehicle) in (b) and the direction of the expected value of the gradient in (c) are similar.

Next, the third term of the formula (1) is concretely expressed by the following formula.

[Formula 10]

$$\rho_g(d_n, d_{n-1}, u_{n-1}) = 0 \quad \text{if } \Delta d_g < t_{g1}, \text{ or } \neg (A) \qquad (8)$$
$$= p_g \quad \text{if } t_{g1} \leq \Delta d_g < t_{g2}, \text{ and } (A)$$
$$= p_\infty \quad \text{if } t_{g2} \leq \Delta d_g, \text{ and } (A)$$

where $\Delta d_g = (d_g[d_{n-1}, u_{n-1}] - d_{n-1})$, (A): $J[d_n, u_n] > 0$, and $g_{acc}[d_{n-1}, u_{n-1}] + UD(d_n, u_n) \leq 0$ Here, $t_{g1}$ and $t_{g2}$ represent predetermined threshold values, $\Delta d_g$ represents the gap length, $p_g$ represents a parameter providing a predetermined penalty according to the gap length, and $p_\infty$ represents an arbitrary large value for removing from the boundary candidate as an impossible path in a case where the gap length exceeds a predetermined value. The conditional formula (A) is the same condition as the formula (4), which is a condition for determining whether the grid ($d_n$, $u_n$) is a gap.

Next, the first term of the formula (2) is concretely expressed by the following formula.

[Formula 11]

$$\rho_b(d_n, d_{n-1}, u_{n-1}) = 0 \quad \text{if } \Delta d_b \neq t_{b1} \text{ and } \Delta d_b < t_{b2} \qquad (9)$$
$$= p_b \quad \text{if } d_b = t_{b1}$$
$$= p_\infty \quad \text{if } t_{b2} \leq \Delta d_b$$

where $\Delta d_b = (d_b[d_{n-1}, u_{n-1}] - d_n)$

Here, $t_{b1}$ and $t_{b2}$ represent predetermined threshold values, $\Delta d_b$ represents the length of the blind spot area, $p_b$ represents a parameter providing a predetermined penalty according to the length of the blind spot area, and $p_\infty$ represents an arbitrary large value for removing from the boundary candidate as an impossible path in a case where the length of the blind spot area exceeds a predetermined value.

Next, details of the traveling road boundary determination unit 105 will be described. The traveling road boundary determination unit 105 first detects, as a tail end position of the optimum path, a grid position ($d_{goal}$, $u_{goal}$) at which the cumulative cost J[d, u] in each grid stored in the optimum path searching unit 106 takes a maximum value $J_{max}$. Moreover, each position of the optimum path is obtained by a back trace. Here, the back trace indicates that $u_{n-1}*[d, u]$ stored in the optimum path searching unit 106 is referred to, and the lateral position $u_{n-1}*$ of the optimum path for each distance (parallax) is restored by going backward in the direction from the tail end position ($d_{goal}$, $u_{goal}$) to $d_{start}$. Based on the processing described above, the path taking the detected optimum path is determined to be the traveling road boundary. Finally, a result is output after confirming that the determined traveling road boundary is not a result with low reliability. At this time, in a case where the $J_{max}$ is lower than a predetermined value or the length of the optimum path in the depth direction (tail end position–start-end position) is shorter than a predetermined value, it is regarded that the reliability of the estimated traveling road boundary is low, and a result is not output assuming that the traveling road boundary has not been estimated. Although the lateral position is measured as a lateral position in the UD space, it is converted as a lateral position in the three-dimensional space and output using a sensor parameter such as a focal point distance.

Then, the traveling support control device 12 carries out traveling support of the vehicle on the basis of the traveling road boundary output by the traveling road boundary determination unit 105. Specifically, it is determined whether there is a risk that the subject vehicle deviates from the road or collides with an obstacle in the lateral direction on the basis of the position of the traveling road boundary and a state of the subject vehicle (e.g., position, traveling direction, speed, and acceleration level). Then, in a case where it is determined that the distance to the end portion of the road or the obstacle in the lateral direction is close and there is a high risk of deviation from the road or a collision, the speaker 15 of the vehicle V is operated to warn the driver (attention seeking), and an accelerator control amount, a brake control amount, and a steering control amount for supporting traveling of the vehicle V are calculated to control the accelerator 13, the brake 14, the steering 16, and the like.

As described above, according to the traveling road boundary estimation apparatus of the first embodiment, on the basis of the feature amount of the traveling road boundary generated by the boundary feature map generation unit 102 and a plurality of traveling road boundary candidates continuous in the depth direction from the coming-within-sight detection start-end position to a given detection tail end position, both positions falling within a preset sensor view angle comprehensively set in accordance with a geometric condition set in the boundary candidate setting unit 106 in advance, a candidate maximizing the evaluation value of the boundary likelihood calculated by adding the continuity evaluation value in the depth direction based on the gradient, the gap length, and the length of the blind spot area included in the feature amount and the boundary shape of the boundary feature map corresponding to the boundary shape of each traveling road boundary candidate is determined to be the traveling road boundary. At this time, since the optimum path in which the cumulative score accumulating the local scores is maximized is searched after setting the detection start-end position and the gradient limitation, it becomes possible to estimate a shape that is optimum when viewed from above, and the boundary can be easily estimated appropriately even in a case where the boundary becomes ambiguous such as a case where there is the road edge having a weak distance feature or an image shading feature and a case where the road edge takes a discontinuous shape.

Furthermore, since there is no limitation on the detection tail end position and it is designed to lower the evaluation value of the boundary likelihood corresponding to the gap length from the tail end position of the boundary shape, an optimum boundary shape having an appropriate detection tail end position can be estimated. As a result, erroneous estimation of the traveling road boundary in a region where, for example, the road edge is discontinued for a certain length or more or the feature amount of the road edge is not sufficiently obtained, can be suppressed, and it becomes possible to estimate and output the traveling road boundary of a vicinity side section considered to be sufficiently reliable.

In a case where the local path is determined to pass through the boundary with the blind spot area, it is designed such that, while a negative evaluation value according to the length of the blind spot area is added, a negative evaluation value according to the deviation from the expected value of the gradient is not added. Therefore, even in a case where the boundary between the road edge of the obstacle edge on the foreground side and the road edge on the background side becomes discontinuous, the traveling road boundary can be estimated by allowing the discontinuity to a certain extent. That is, in a case where a certain condition is satisfied, the boundary between the road edge of the obstacle edge, the road edge on the background side, and the blind spot area connecting the road edges can be appropriately estimated as the traveling road boundary.

Figure 10A:
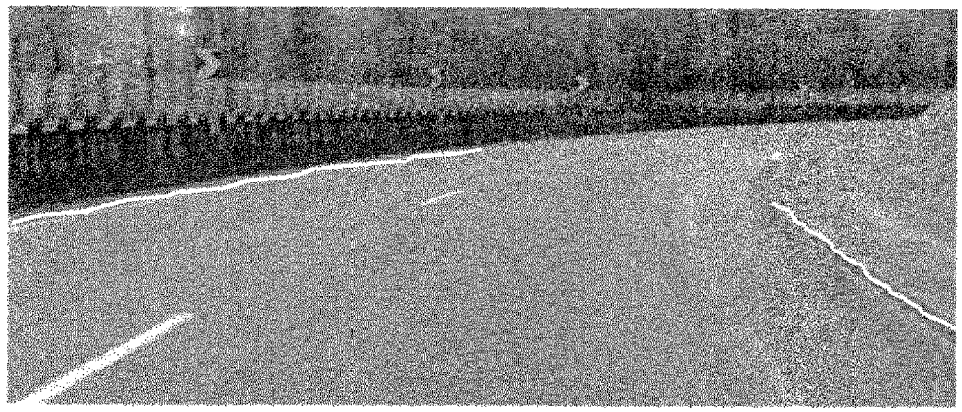
FIGS. 10A to 10C are views illustrating an exemplary estimation result of a traveling road boundary.
Figure 10B:
Figure 10C:
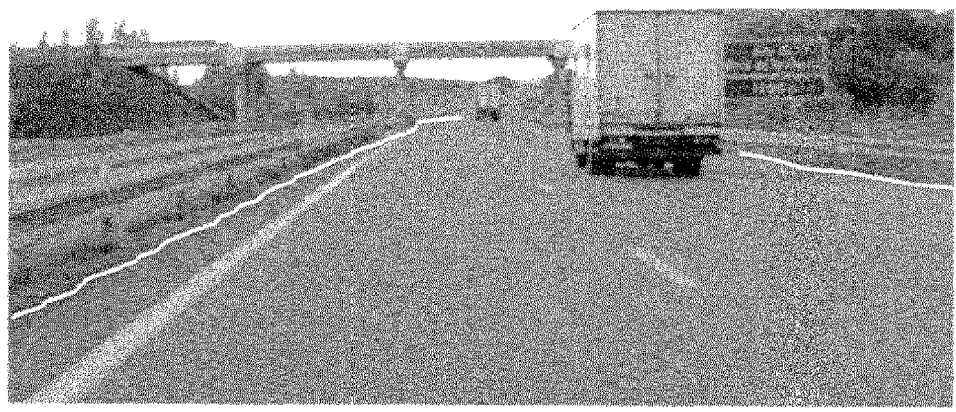

FIGS. 10(a), 10(b), and 10(c) illustrates exemplary road boundaries estimated by the traveling road boundary estimation apparatus 10. It can be seen from (a) that the traveling road boundary is appropriately estimated even at the position of the curbstone at the right road edge where the height is low and the feature amount is poor as well as the side wall with a high height that is the left road edge. Further, with respect to the curbstone at the right road edge, the range where the obstacle surface is visible is limited to the vicinity by the stereo camera due to the sharp curve, and the scene is such that no corresponding boundary feature amount is present beyond a certain distance.

In the estimation result of (a), the traveling road boundary is appropriately estimated in the section from the vicinity to the end position where the obstacle surface of the curbstone is visible, and it can be seen that the boundary of the highly reliable section is output.

In (b), it can be seen that the edge of the vehicle and the end portion of the road on the far side are appropriately estimated as the traveling road boundary in a case where the vehicle blocks the end portion of the road and the end portion of the road on the vicinity side is invisible.

In (c), in a case where the end portion of the road is sufficiently visible from the detection start-end position to a certain section while the vehicle blocks the end portion of the road, it can be seen that the end portion of the road is estimated to be the traveling road boundary, and the position made discontinuous by the blocking of the obstacle is appropriately estimated to be the detection tail end position.

Although the boundary feature is generated on the basis of the distance image calculated by the stereo camera in the boundary feature map generation unit 102 in the present embodiment, it may be based on distance data measured using a distance sensor such as a radar. Furthermore, instead of the distance image, it may be generated on the basis of edge information of a gray-scaled image obtained by the camera, or may be generated on the basis of both of the gray-scaled image and the distance image by weighting the boundary feature based on the image edge and the boundary feature based on the distance image and adding them together.

In the present embodiment, it is described that in the boundary likelihood evaluation unit 104, the yaw angle of the vehicle with respect to the road is zero and a value of a case where a straight road is assumed can be used as the expected value of the gradient. Naturally, it is also possible to estimate the yaw angle of the vehicle with respect to the road and the more precise expected value of the gradient may be calculated on the basis of a result of estimating a curve shape of the road. The yaw angle of the vehicle with respect to the road and the curve shape of the road can be estimated on the basis of, for example, a result of white line detection. Further, the expected value of the gradient may be set on the basis of the edge feature amount in each part of the image, or may be set using map information and subject vehicle position information, or position, gradient, and subject vehicle position information of the traveling road boundary detected at the previous time.

Although it is described that the negative evaluation value according to the deviation from the expected value of the gradient is added in the boundary likelihood evaluation unit 104 according to the present embodiment, a negative evaluation value corresponding to the deviation from the expected value of the boundary position may be further added. With respect to the expected value of the boundary position, for example, it may be set on the basis of the white line detection result, and an area within a certain range outside the white line in the road direction may be set to be the expected value.

Further, it may be set on the basis of the map information and the subject vehicle position information, or may be set using the position, gradient, and subject vehicle position information of the traveling road boundary detected at the previous time. In this manner, in a case where a certain degree of validity can be secured in a precondition concerning prior knowledge of the road shape, or in a case where a certain degree of precision of a preliminary measurement by another means can be secured, the expected value related to the geometric shape of the traveling road boundary is set, and the negative evaluation value according to the deviation from the expected value is added, whereby the traveling road boundary can be estimated stably and appropriately. As attributes of other geometric shapes, for example, a curvature of the road can be considered.

Second Embodiment

Figure 11:
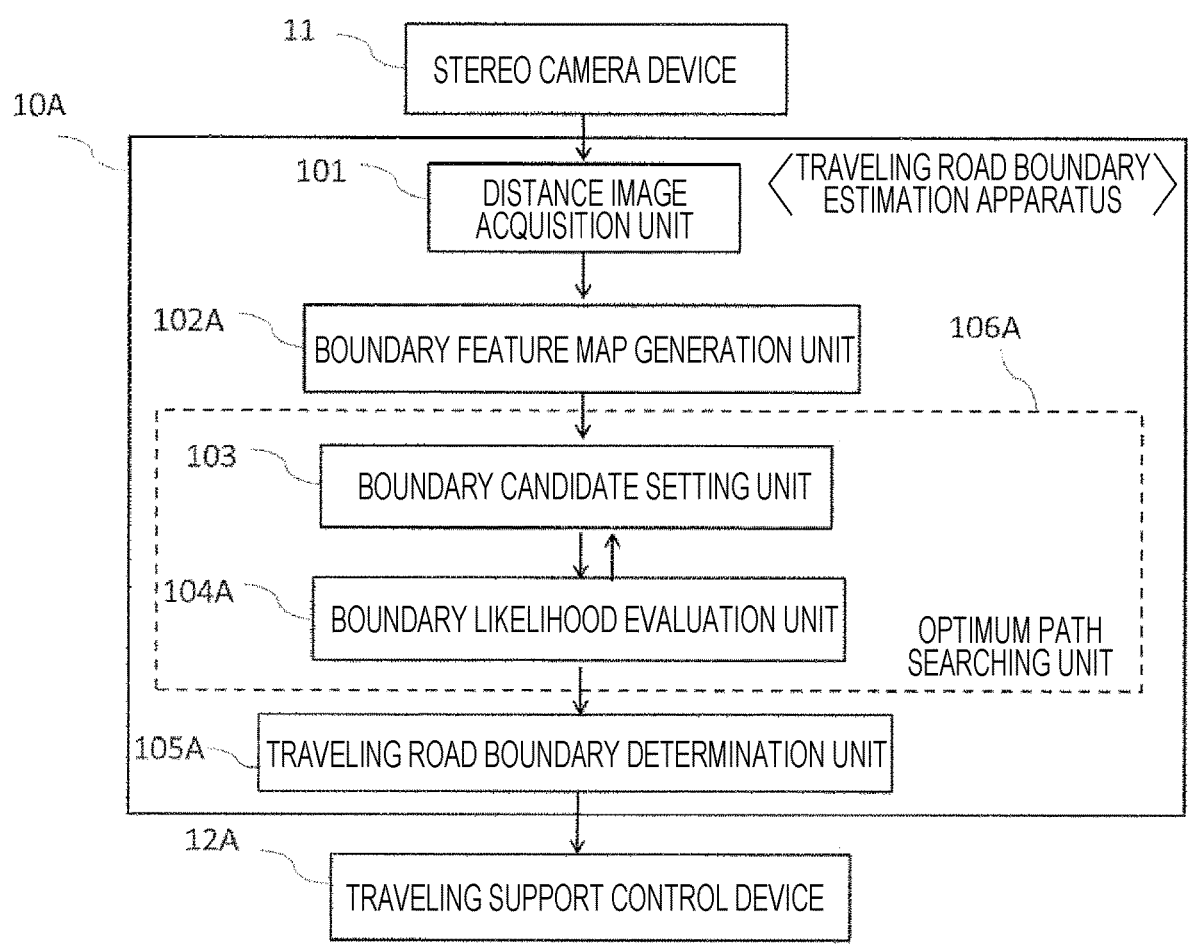
FIG. 11 is a configuration diagram of a second embodiment.

FIG. 11 illustrates a configuration according to a second embodiment. Note that the configurations similar to the traveling road boundary estimation apparatus 10 according to the first embodiment are denoted by the same reference signs, and the descriptions thereof will be omitted. A traveling road boundary estimation apparatus 10A according to the second embodiment is different from the configuration according to the first embodiment in that a plurality of boundary feature maps are mainly generated and a plurality of road boundaries is output on the basis of the plurality of boundary feature maps, and the other configurations are in the similar manner.

A feature map generation unit 102A generates a feature map using a means similar to that of the feature map generation unit 102 according to the first embodiment. A plurality of boundary feature maps is generated on the basis of settings of a plurality of predetermined combinations with respect to a parameter of a road surface feature suppression processing unit, a parameter of a feature amount normalization processing unit, or a parameter of a background feature subtraction processing unit. The settings of the plurality of predetermined combinations are, for example, two parameters one of which is a parameter (A) determined such that the boundary feature amount takes a relatively large value even with an obstacle having a low height such as a curbstone, and the other is a parameter (B) determined such that the boundary feature amount takes a value that is small or zero or less, with an obstacle having a low height such as a curbstone and can be considered to be crossed over. On the basis of such settings, a boundary feature map (A) generated on the basis of the parameter (A) and a boundary feature map (B) generated on the basis of the parameter (B) are generated.

Next, in a boundary likelihood evaluation unit 104A, processing similar to that of the boundary likelihood evaluation unit 104 is performed. A boundary likelihood evaluation value (A) calculated with reference to the boundary feature map (A) and a boundary likelihood evaluation value (B) calculated with reference to the boundary feature map (B) are calculated at the time of calculating a boundary likelihood evaluation value. A traveling road boundary determination unit 105A determines a traveling road boundary (A) and a traveling road boundary (B) that take optimum paths from the viewpoint of the boundary likelihood evaluation values (A) and (B), respectively, and outputs them.

Similar to the traveling support control device 12, a traveling support control device 12A warns a driver and controls a vehicle V as necessary, and it is characterized in that determination of a traveling state and a traveling support is performed on the basis of the traveling road boundary (A) and the traveling road boundary (B). As the traveling state, for example, a normal traveling state (A) in which there is no risk of collision with a forward obstacle is set, and a traveling state (B) in which there is a risk of collision with a forward obstacle and collision avoidance is required is set. Then, for example, it is determined whether it is in the traveling state (A) or in the traveling state (B) according to a distance and a relative distance to the forward obstacle detected by a stereo camera device 11. Subsequently, in the case of the traveling state (A), traveling support is performed on the basis of the traveling road boundary (A) not to deviate from the boundary that can be regarded as an end portion of the road even it is a small obstacle such as a curbstone, and in the case of the traveling state (B), when it is determined that collision with the forward obstacle cannot be avoided unless it deviates from the traveling road boundary (A), the vehicle V is controlled to perform emergency evacuation such that it deviates from the traveling road boundary (A) and does not deviate from the traveling road boundary (B).

As described above, in the second embodiment, a plurality of road boundaries is estimated from a viewpoint of a plurality of evaluation measures on the basis of defining a plurality of boundary features so that suitable boundary position information can be referred to depending on the traveling state, whereby an appropriate traveling support can be performed according to the situation.

Furthermore, although it is characterized in that a plurality of boundary feature maps is generated in the present embodiment, a single boundary feature map may be generated by dynamically setting the parameters to obtain the similar effects. In such a case, it can be considered that the parameter in the boundary feature map generation unit is dynamically set to be a value suitable for the traveling road boundary required in the traveling state by the traveling state information being input to the boundary feature map generation unit.

Third Embodiment

Figure 12:
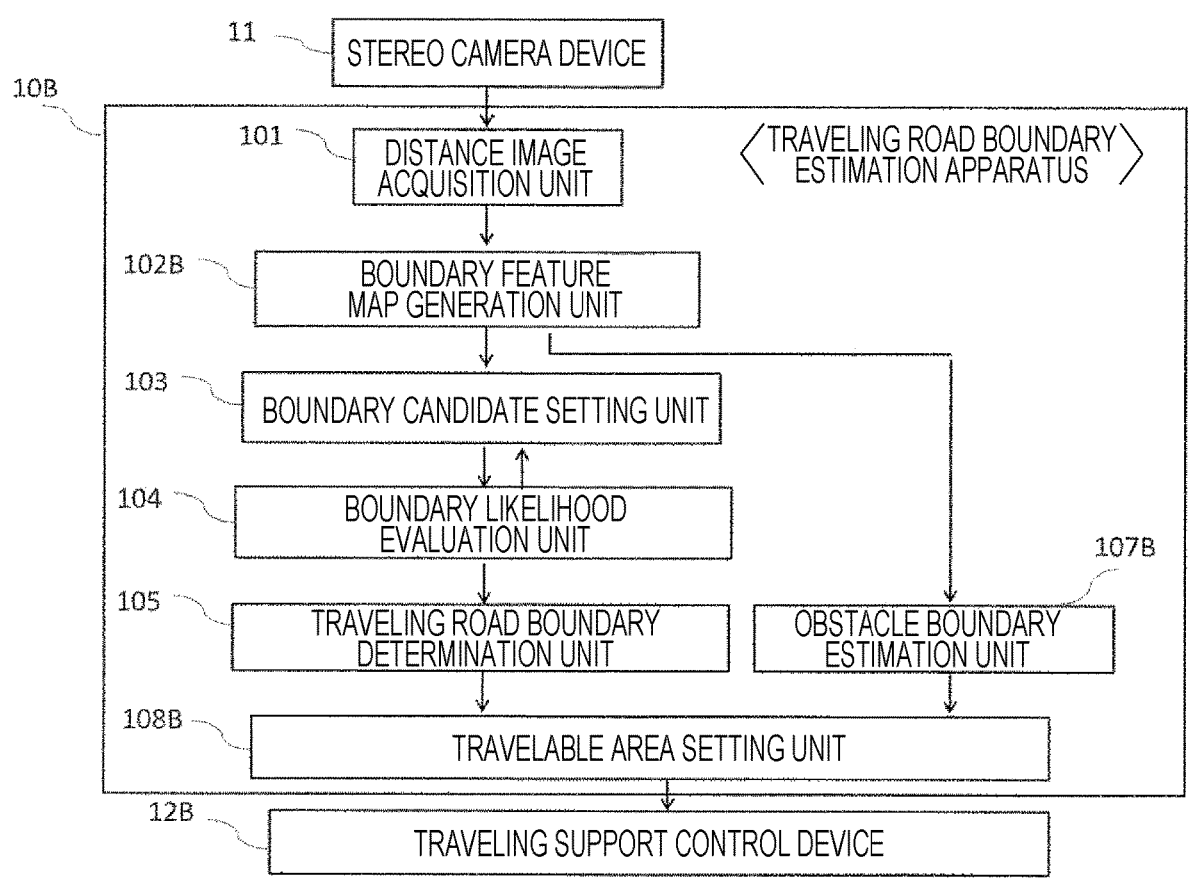
FIG. 12 is a configuration diagram of a third embodiment.

FIG. 12 illustrates a configuration according to a third embodiment. Note that the configurations similar to the traveling road boundary estimation apparatus 10 according to the first embodiment are denoted by the same reference signs, and the descriptions thereof will be omitted. In addition to the configuration of the first embodiment, a traveling road boundary estimation apparatus 10B according to the third embodiment is different in a boundary feature map generation unit 102B mainly generates a plurality of boundary feature maps, and an obstacle boundary estimation unit 107B and a travelable area setting unit 108B are added, and the other configurations are in the similar manner.

In a similar manner to the boundary feature map generation unit 102A according to the second embodiment, the boundary feature map generation unit 102B generates two boundary feature maps on the basis of two parameter settings. Here, the settings of the two parameter settings are a parameter (A) determined such that the boundary feature amount takes a relatively large value even with an obstacle having a low height such as a curbstone, and a parameter (B) determined such that the boundary feature amount takes a value that is small or zero or less, with an obstacle having a low height such as a curbstone and is not regarded as the obstacle that cannot be crossed over.

Among these, the boundary feature map generated on the basis of the parameter (A) is input to a boundary candidate setting unit 103, and in the subsequent processing, the traveling road boundary is output by a traveling road boundary determination unit 105 in the processing similar to that in the first embodiment. The boundary feature map generated on the basis of the parameter (B) is input to the obstacle boundary estimation unit 107B.

In the obstacle boundary estimation unit 107B, a left end of a sensor view angle is set to be a detection start-end position, and a right end of the sensor view angle is set to be a detection tail end position. A boundary line (obstacle boundary) with an obstacle continuous in the sensor transverse angle direction is estimated. As a method of estimating the boundary line with such an obstacle, for example, the method disclosed in the prior art document 2 is used.

In the travelable area setting unit 108B, a travelable area is set on the basis of the traveling road boundary estimated in the traveling road boundary determination unit 105 and the obstacle boundary estimated in the obstacle boundary estimation unit 107B. As a method of setting, for example, a boundary position on the near side of the traveling road boundary and the obstacle boundary estimated in each line of sight direction of the sensor is set to be the end portion of the travelable area, and a region within the sensor view angle and on the near side of the end portion of the travelable area is set to be the travelable area.

Here, the obstacle boundary is obtained in the continuous boundary in the sensor transverse angle direction. However, the boundary position is not appropriately estimated with a small obstacle such as a curbstone, and tends to be estimated at the position of a large obstacle on the far side. Accordingly, while the traveling road boundary is appropriately estimated at the boundary position of the small obstacle such as a curbstone, the boundary is not estimated at the position of the obstacle in the front direction on the road. By integrating such different boundary information, a boundary line not discontinuous in the sensor transverse angle direction can be obtained, and the boundary in the side direction can be appropriately determined at the position of the road edge with a low height such as a curbstone, whereby the travelable area can be accurately set in a format more convenient than using only one of them as the boundary information.

FIG. 13 illustrates a conceptual view of the travelable area set in this manner. Here, (a) illustrates a conceptual view of the traveling road boundary, (b) illustrates a conceptual view of the estimated obstacle boundary, and (c) illustrates a conceptual view of the set travelable area and its end portion. The boundary is indicated by a white line, and the travelable area is indicated by a hatched area.

In a similar manner to the traveling support control device 12, a traveling support control device 12B warns a driver and controls a vehicle V as necessary, and it is characterized in that it is capable of performing integrated determination including a collision risk with an obstacle in the longitudinal direction in addition to deviation of a vehicle from the road in the lateral direction and a collision risk with an obstacle in the lateral direction on the basis of the travelable area set by the travelable area setting unit 108. For example, in consideration of the travelable area and ride comfort, a route with less deviation from the road and less risk of collision with an obstacle is planned and the vehicle V is controlled. The ride comfort is based on a speed and an acceleration level of the vehicle V. A number of route candidates are set within a range not deviating from the end portion of the travelable area, and among those route candidates, an optimum route is selected from the viewpoint of margin with the end portion of the travelable area and the ride comfort. By controlling the vehicle V on the basis of the route planned in this manner, there is no need to divide the control in the lateral direction of the vehicle and the control in the longitudinal direction, whereby the simpler and more reliable traveling support can be achieved.

The invention claimed is:

1. A traveling road boundary estimation apparatus comprising:
    a processor that is configured to:
        generate, on the basis of an image obtained from an external sensor, a boundary feature map for storing a feature amount regarding a presence of a traveling road boundary for each grid of the image or an image obtained by converting the image into an image of another visual point;
        set a plurality of paths continuous in a depth direction from a coming-within-sight detection start-end position to a given detection tail end position, both positions falling within a preset sensor view angle, as a boundary candidate;
        calculate a boundary likelihood evaluation value in which a feature amount of the boundary feature map and a continuity evaluation value in the depth direction are added with respect to the boundary candidate; and
        determine a traveling road boundary by comparing the boundary likelihood evaluation value of each boundary candidate calculated in the processor,
            wherein in the processor, the continuity evaluation value in the depth direction is a negative evaluation value according to deviation of an expected value of a gradient in the depth direction of the traveling road boundary in each part of a boundary shape, and the expected value of the gradient is a gradient based on an edge feature amount in each part of the boundary shape, a gradient estimated by assuming a straight road with respect to a subject vehicle, a gradient of a white line detected by the external sensor, a gradient estimated using map information and subject vehicle position information, or a gradient estimated using position, deviation, and subject vehicle behavior information of the traveling road boundary detected at a previous time.

2. The traveling road boundary estimation apparatus according to claim 1, wherein in the processor, a geometric constraint condition in which a gradient in the depth direction in each part shape of the traveling road boundary is within a certain range is used.

3. The traveling road boundary estimation apparatus according to claim 1, wherein in the processor, in addition to the feature amount of the boundary feature map and the continuity evaluation value in the depth direction, a negative evaluation value according to deviation from an expected value of a position of the traveling road boundary is added to the boundary likelihood evaluation value, and the expected value of the position of the traveling road boundary is at a position estimated on the basis of a white line position detected by the external sensor, a position estimated using map information and subject vehicle position information, or a position estimated using position, gradient, and subject vehicle behavior information of the traveling road boundary detected at a predetermined time.

4. The traveling road boundary estimation apparatus according to claim 1, wherein in the processor, a negative value according to a gap length indicating a length regarded that the traveling road boundary is discontinuous on the basis of the boundary feature map is further added to the continuity evaluation value in the depth direction.

5. The traveling road boundary estimation apparatus according to claim 1, wherein in the processor, a predetermined negative value is added to the continuity evaluation value in the depth direction in a case where a path is determined to be a boundary with a blind spot area on the basis of an extending direction in the depth direction of the processor and the boundary feature map, and a negative value according to the deviation from the expected value of the gradient in each part of the boundary shape is not added.

6. The traveling road boundary estimation apparatus according to claim 5, wherein in the processor, a section determined to be the boundary with the blind spot area existing in the traveling road boundary is output in addition to the traveling road boundary.

7. The traveling road boundary estimation apparatus according to claim 1, wherein the processor expresses a path of a traveling road boundary as a cumulative path combining a local path connecting grids between adjoining distances of the boundary feature map, and comprehensively sets combinations possibly taken by the cumulative path within a preset geometric attribute limitation range of the traveling road boundary.

8. The traveling road boundary estimation apparatus according to claim 7, wherein the processor sequentially sets the cumulative path from a vicinity side to a farther side of the boundary feature map in a distance direction, calculates a boundary likelihood evaluation value of the cumulative path, and in a case where a plurality of paths taking a same position and having different intermediate paths exists in an arbitrary distance, paths other than a path with a maximum boundary likelihood evaluation value of the cumulative path are rejected from boundary candidates.

9. The traveling road boundary estimation apparatus according to claim 1, wherein the boundary feature map stores, as a boundary feature, a value corresponding to certainty in which the traveling road boundary exists in a spatial position corresponding to each grid on the basis of a distance image measured by a distance sensor or on the basis of a gray-scaled image captured by a camera.

10. The traveling road boundary estimation apparatus according to claim 1, wherein the processor is also configured to:
    generate an occupancy grid map storing a feature amount in which an obstacle exists in each grid position on the basis of a distance image measured by a distance sensor;
    set a feature amount difference value for suppressing a feature amount corresponding to a road surface position of the occupancy grid map;
    set a feature amount difference amount for performing normalization such that the feature amount of each grid position in the occupancy grid map does not exceed a predetermined value;
    set a feature amount difference value for suppressing a feature amount of a grid considered to be on a far side of an obstacle on a forefront side viewed from a sensor of the occupancy grid map; and add the feature amounts set to the feature amount of the occupancy grid map.

11. The traveling road boundary estimation apparatus according to claim 10, wherein the processor dynamically changes a parameter, or the background feature suppression processing according to a traveling state of a vehicle.

12. The traveling road boundary estimation apparatus according to claim 10, wherein the processor generates a plurality of boundary feature maps on the basis of a plurality of combinations of a parameter and calculates a boundary likelihood evaluation value of a plurality of scales on the basis of the plurality of boundary feature maps, and determines a plurality of road boundaries optimum for evaluation values of the respective scales on the basis of the boundary likelihood evaluation values of the respective scales and outputs the road boundaries.

13. The traveling assistance system according to claim 12, wherein traveling support of a vehicle is performed on the basis of the plurality of road boundaries output from the traveling road boundary estimation apparatus and a traveling state of a vehicle.

14. The traveling road boundary estimation apparatus according to claim 1, wherein the image obtained from the external sensor is both a gray-scaled image and a distance image, and the boundary feature map is used by weighting each of a boundary feature map based on shading information and a boundary feature map based on distance information and adding each other, or one of the boundary feature maps is selectively used.

15. A traveling assistance system according to claim 1, comprising:
   the traveling road boundary estimation apparatus according to claim 1; and
   a traveling support control device that supports traveling of a vehicle on the basis of a traveling road boundary output by the traveling road boundary estimation apparatus.

16. The traveling road boundary estimation apparatus according to claim 1, wherein the processor is also configured to:
   estimate an obstacle boundary that is a boundary with an obstacle continuous in the sensor transverse angle direction from the left detection start-end position of the sensor view angle to the right detection tail end position of the sensor view angle using information associated with a preset obstacle shape; and
   set a travelable area on the basis of the traveling road boundary and the obstacle boundary.

* * * * *